United States Patent [19]

Wörner

[11] Patent Number: 4,655,275
[45] Date of Patent: Apr. 7, 1987

[54] TOOL, PARTICULARLY AN INJECTION MOLD

[76] Inventor: Alois Wörner, Dreitorestrasse 6, D-7580 Bühl-Neusatz, Fed. Rep. of Germany

[21] Appl. No.: 806,286

[22] Filed: Dec. 6, 1985

[30] Foreign Application Priority Data

Dec. 8, 1984 [DE] Fed. Rep. of Germany ....... 3444800
Mar. 22, 1985 [DE] Fed. Rep. of Germany ....... 3510329

[51] Int. Cl.⁴ .......................................... B22D 33/00
[52] U.S. Cl. ..................................... 164/341; 164/342; 100/918; 425/542; 425/190; 425/195
[58] Field of Search .............................. 164/339–343; 100/918; 425/542, 190, 192 R, 193, 195

[56] References Cited

U.S. PATENT DOCUMENTS

| | | | |
|---|---|---|---|
| 3,229,791 | 1/1966 | Soman | 100/918 |
| 3,702,560 | 11/1972 | Weidel | 100/918 |
| 3,862,565 | 1/1975 | Smit | 100/918 |
| 4,274,332 | 6/1981 | Nakamura | 100/918 |
| 4,484,880 | 11/1984 | Schwarz | 425/192 R |

*Primary Examiner*—Nicholas P. Godici
*Assistant Examiner*—Samuel M. Heinrich
*Attorney, Agent, or Firm*—Erwin S. Teltscher

[57] ABSTRACT

A tool to be mounted on a machine with receiving plates has tool halves which are movable relative to one another, and each mountable on the respective one of the receiving plates of the machine, by fast clamping plates mountable on the receiving plates of the machine, and by fast coupling formations which are rigid, and releasably connect the two halves with the fast clamping plates. The fast coupling formations include a plurality of receiving openings provided in the fast clamping plates, and a plurality of clamping pins which extend laterally beyond the tool halves, and are received in the receiving openings. The fast coupling formations also include transverse recesses provided in the clamping pins and extending substantially perpendicularly thereto, and locking elements which form-lockingly engage the transverse recesses, the coupling formations further including bearing openings provided in the fast coupling plates and extending perpendicularly to the receiving openings or the clamping pins, so that the locking elements are received in the bearing openings, and are disengagable from the transverse recesses of the clamping pins. Each of the fast clamping plates defines a plane, and the receiving openings extend substantially perpendicularly to the plane of a respective fast clamping plate. Each clamping pin has a free end, and a portion which in a coupling position engages a respective receiving opening, and is provided with a cone which narrows toward the free end of a respective clamping pin.

4 Claims, 8 Drawing Figures

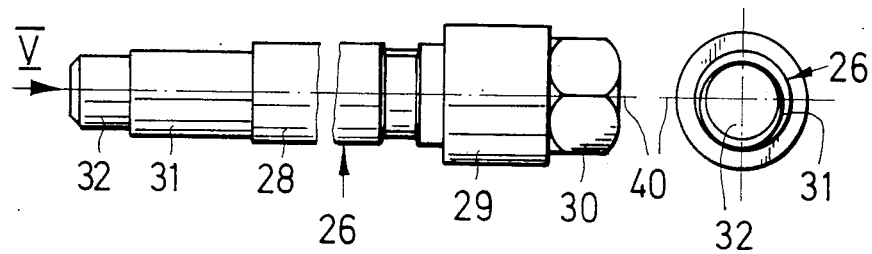
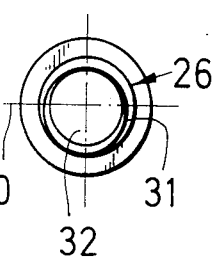
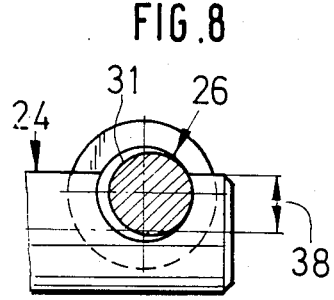
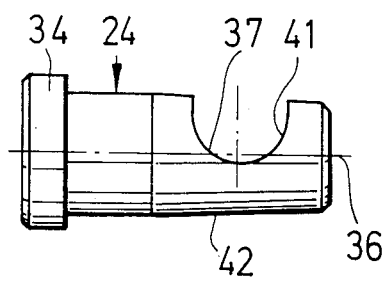
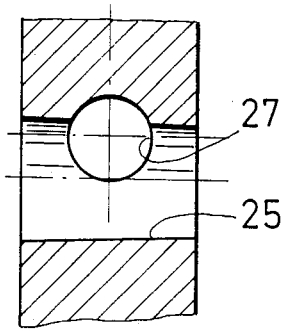

TOOL, PARTICULARLY AN INJECTION MOLD

BACKGROUND OF THE INVENTION

The present invention relates to a tool with two tool halves which are movable relative to one another and mountable on a receiving plate of a machine. Each of the tool halves is connected fixedly and releasably by a fast coupling means with a fast clamping plate mountable on the respective receiving plate of the machine. The fast coupling means have several clamping pins, which project over the respective tool halves and are received in respective receiving openings of the fast clamping plate associated with the respective tool half. The fast coupling means also includes locking elements which form-lockingly engage in transverse openings or recesses extending substantially perpendicularly to the longitudinal axis of the clamping pins. The locking elements are received in bearing openings which extend perpendicularly to the receiving openings of the clamping pins, and are displaceable out of their engaging positions in the transverse openings or recesses of the clamping pins. In particular, the present invention relates to an injection mold with mold halves which are mountable on the respective vertically extending receiving plates of an injection molding machine.

The terms "tool half" or "mold half" in the sense of the present invention mean both parts of a tool or a mold which are movable relative to one another, even in the case when the separation plane does not extend along the center of the tool or of the mold, and the oppositely movable parts of the tool or of the mold can be formed differently from one another.

Tools are known which have tool or mold halves that are rigidly, yet releasably connectable by fast coupling means with fast clamping plates, which are mountable on the receiving plates of the respective machines.

The PCT application WO No. 83/01038 discloses a mounting arrangement for the mold tool of an injection molding machine on mold supports, in which clamping pins extend laterally from the mold halves of a mold tool, and engage in the respective recesses in the mold support plates. The mold support plates have guides which extend perpendicularly to the above-mentioned recesses for receiving the clamping means in the coupling positions. Wedges are movably received in the guides, and form locking means for the clamping pins, so that in the locking position the wedges extend through the transverse openings of the clamping pins and secure the latter in their positions. A cylinder-piston unit, which utilizes a hydraulic fluid, serves for actuation of the locking means formed as wedges, between, on one hand, their locking positions, in which they engage in the transverse openings of the clamping means, and, on the other hand, their released positions, in which they are withdrawn from the clamping means.

The DE-OS No. 3,140,837 also discloses a pressure molding machine with a similar mounting arrangement for the mold tools on the mold support plates of the machine. In this known mounting arrangement the clamping pins extend laterally from the mold support halves of the mold tool, and engage in respective openings of the machine plates, and wedges which are axially movable perpendicularly to the above-mentioned recesses in respective guiding openings arrest the clamping pins, so as to form-lockingly engage portions of the clamping pins received in the recesses in the coupling position.

The provision of such tools with mounting arrangements of the above-described type permits a fast and trouble-free tool replacement. However, and the halves of a tool must be mounted on the respective receiving plates of the respective machine in an accurately centered manner. This requirement has not been achieved in the known mounting arrangements, since during insertion of the clamping pins into the receiving openings with lateral projection over the two halves, or during disassembly, jamming can take place between the receiving openings and the clamping pins. It is to be understood that this makes a fast and simple tool exchange impossible. Particularly there exists the risk with such jamming actions, that the wedges which engage in the locking position with the clamping pins, can cause deformation of these clamping pins. In such a case it is impossible, or possible only with great efforts, to disassemble a tool received in the machine.

SUMMARY OF THE INVENTION

Accordingly, it is an object of the present invention to provide a tool of the above-mentioned general type, which avoids the disadvantages of the prior art.

More particularly, it is an object of the present invention to provide a tool of the above-mentioned type, which is equipped with simple and operationally reliable means for fast and trouble-free mounting and disassembly in a corresponding machine, particularly in an injection molding or pressure molding machine for manufacturing synthetic plastic parts.

In keeping with these objects and with others which will become apparent hereinafter, one feature of the present invention resides, briefly stated, in a tool in which the clamping pins have portions which engage in a coupling position respective receiving openings extending in fast clamping plates perpendicularly to the plane of their plates, and wherein these portions of the clamping pins are provided with cones which narrow toward free ends of the clamping pins.

When the clamping pins are formed in accordance with the present invention, they can be easily inserted into their receiving openings and simultaneously centered, on one hand, and also can be uncoupled in a trouble-free manner, so as to separate a tool half from the associated fast clamping plate in the coupling position, on the other hand.

Especially easy handling is ensured, when a cone situated at the free end of a respective clamping pin, extends over the entire length of that clamping pin portion, which in the coupling position engages the receiving opening of the fast clamping plate. It is advantageous if the receiving openings for the clamping pins, which are provided in the fast clamping plates and extend perpendicularly to the plane of the plate, are formed as conical openings corresponding to the cones of the clamping pins.

The thus formed mounting arrangement for the inventive tool, which includes two clamping pins for each tool half, ensures not only its coupling functions, but also a positionally correct arrangement of a tool half and a fast clamping plate relative to one another, so that no other centering means or special alignment of the tool during mounting is required.

Another important feature of the present invention is that the locking elements, which are displaceably received in an axial direction in the bearing openings of the fast clamping plates, include rotatably supported locking rods with eccentric clamping cams, which engage in their coupling position in transverse recesses of respective clamping pins, the eccentric clamping cams being clamped to clamping faces of the transverse recesses.

In this particular embodiment of the invention, after the clamping pins have been inserted into their receiving openings, the locking rods are axially shifted into their respective bearing openings, so as to form-lockingly engage in the transverse recesses of the clamping pins in a holding position. Therefore in this position the respective tool half has already been arrested, or held on the respective associated fast clamping plate. For finally locking the parts which are to be coupled to one another, it suffices to rotate the locking rods received in the bearing openings about their longitudinal axes, so as to cause the eccentric clamping cams to cooperate with the respective clamping surfaces of the transverse openings in the clamping pins, and thereby to produce a form-locking, rigid and at the same time releasable connection.

In view of the forces which the clamping means are required to receive in such tools, and which sometimes can reach significant values, it is advantageous if the locking rods in the engaged position of their eccentric clamping cams are supported in respective transverse recesses of the clamping pins in bearing openings on each side of a respective clamping cam. With these features, the bending stresses which act on the eccentric clamping cams are considerably reduced relative to a floating arrangement of the eccentric clamping cams.

In accordance with a further advantageous embodiment of the invention, the transverse recesses in the portions of the clamping pins, which engage in the coupling position the receiving openings of the fast clamping plates, are formed as approximately U-shaped recesses open at one side, which extend substantially along the longitudinal axis of the clamping pins, and which are limited by respective clamping surfaces at the side facing the respective free end of the clamping pins.

The novel features of the present invention are set forth in particular in the appended claims. The invention itself, both as to its construction and manner of operation, will be best understood from the following description of the preferred embodiments, with reference to the accompanying drawings.

BRIEF DESCRIPTION OF THE DRAWING

FIG. 4 is a view showing the locking rod on an enlarged scale;

FIG. 5 is a view showing the locking rod as seen in the direction of the arrow V in FIG. 4 toward an eccentric clamping cam;

FIG. 6 is a large-scale view of a clamping pin;

FIG. 7 is a view showing a section of a fast clamping plate with a conical receiving opening for a clamping pin; and FIG. 8 is a view showing cooperation of the eccentric clamping cam of the locking rod with a transverse recess in the clamping pin.

DESCRIPTION OF THE PREFERRED EMBODIMENT

Figure 2:
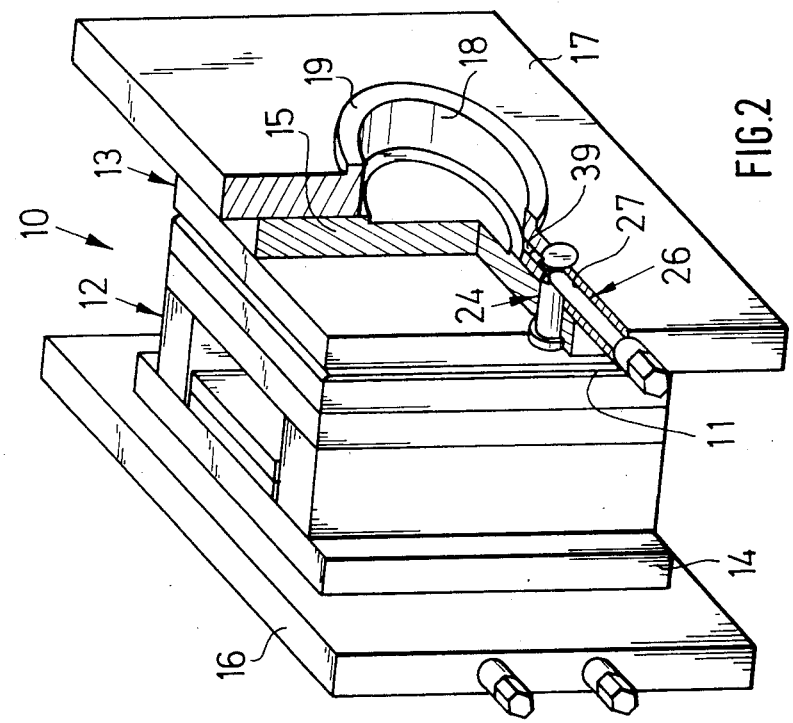
FIG. 2 is a perspective view of the injection mold of FIG. 1 in the mounted position in part-section.

An injection mold 10 shown in FIG. 2 has two mold halves 12 and 13 which are separated by a partition joint 11 and provided with outer plates 14 and 15. The plates 14 and 15 are received between fast clamping plates 16 and 17 and fixably but removably connected with the latter by fast coupling means which will be described herein below. The fast clamping plates 16 and 17 are provided with centering projections 19 in the region of recesses 18 at their sides which face away from one another.

Figure 1:
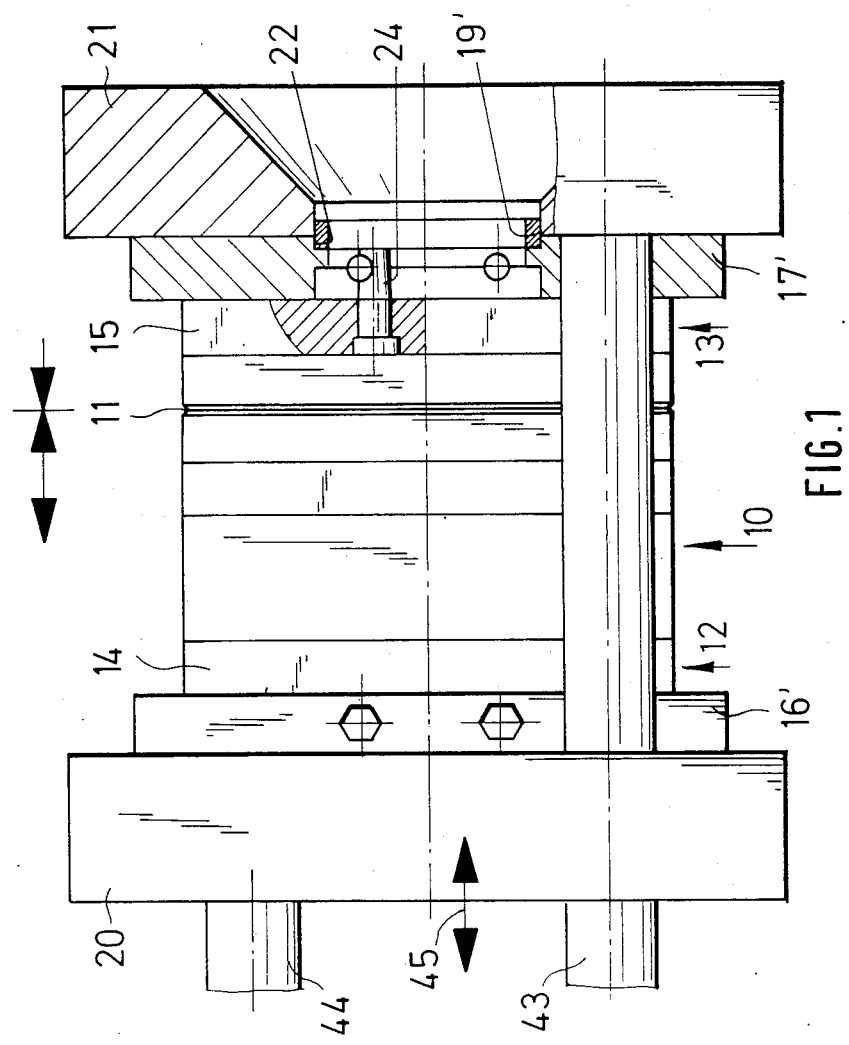
FIG. 1 is an elevation view of an injection mold serving as a tool, and which is received between a stationary plate and a movable receiving plate of an injection molding machine.

During respective mounting of the injection mold 10 between receiving plates 20 and 21 of an injection molding machine shown in FIG. 1, the centering projections 19 engage the centering openings 22 of the above mentioned receiving plates 20 and 21, and thereby provide centering of the mold halves 12 and 13 with respect to the receiving plates 20 and 21 of the machine. The fast clamping plates 16 and 17 are rigidly and releasably connected with the receiving plates 20 and 21 of the machine by mounting screws which are not shown.

In the embodiment of FIG. 1, the fast clamping plates 16' and 17' are not provided with centering projections, but instead with a recess which is self-locking on rotation, and which corresponds to the centering opening 22 in the receiving plates 20 and 21, and into which a centering ring 19' has been inserted. The centering rings 19' simultaneously engage the centering openings 22 of the neighboring receiving plates 20 and 21 of the machine and provide, similarly to the projections 19 of the embodiment of FIG. 2, a positionally correct mounting of the fast clamping plates 16' and 17' on the receiving plates 20 and 21 of the machine. The screws for mounting the fast clamping plates 16' and 17' on the receiving plates 20 and 21 of the machine are also not shown.

Figure 3:
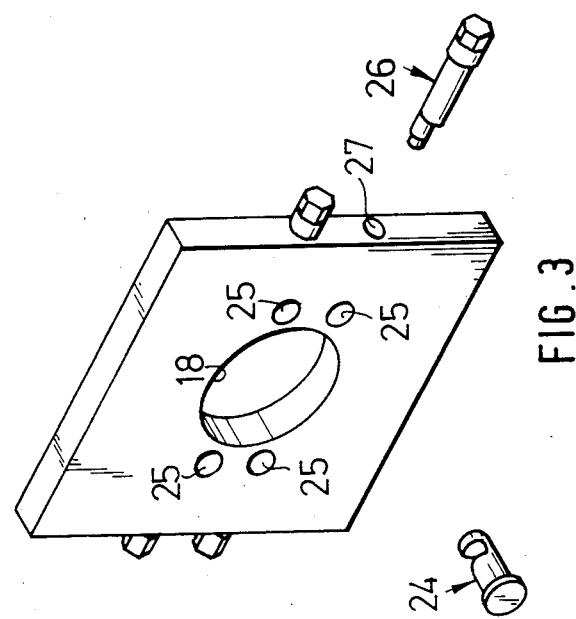
FIG. 3 is an exploded perspective view of a fast clamping plate with respective clamping pins, and a locking rod.

The first coupling means for rigid and at the same time releasable connection of the mold halves 12 and 13 with respective fast clamping plates 16 and 17 or 16' and 17' include clamping pins 24, which rigidly connect the mold halves 12 and 13 with outer plates 14 and 15, and extend beyond the planes of the above mentioned plates 14 and 15. The fast coupling means also include the receiving openings 25, which are arranged in the fast clamping plates 16,17 or 16',17' at locations matching those of the clamping pins 24, and which extend perpendicularly to the plane of the aforementioned fast clamping plates 16, 17 or 16', 17'. The receiving openings 25 are arranged symmetrically with respect to a vertical plane intersecting the centering opening 18, and extending through the respective fast clamping plates 16, 17 or 16', 17', and also symmetrically relative to the receiving opening 18. Finally, the fast coupling means include locking rods 26 which are received in bearing openings 27, as clearly shown in FIGS. 2 and 3, and extend within the plane of a respective fast clamping plate 16, 17 or 16', 17' perpendicularly to the receiving openings 25 for the clamping pins 24, so as to intersect the receiving openings 25 at a location spaced from the center of the fast clamping plate 16, 17 or 16', 17'. This will be described in detail hereinbelow.

As shown particularly in FIG. 4, each of the locking rods 26 has a pin portion 28, which corresponds to the bearing opening 27, and is limited on one side thereof by a ring-shaped flange 29 that is connected with a wrench abutment portion 30. On its other side the pin portion 28 is connected with an eccentric clamping cam 31, and the latter is connected with a bearing pin 32, which extends coaxially to the pin portion 28 and has a diameter smaller than the diameter of the pin portion 28.

The clamping pins 24 are rigidly connected with the outer plates 14 and 15 of the two tool halves 12 and 13, and extend outwardly beyond the outer surfaces of these outer plates 14 and 15. As shown particularly in FIG. 6, each of the clamping pins 24 is provided at its side facing towards its respective tool half 12 or 13 with a pin head 34, each of which is received in the respective tool half 12 or 13. At the pin end which is distal from the pin head 34, each clamping pin 24 is provided with a narrowing cone 42. Each clamping pin 24 is also provided with a transverse recess 37 in the vicinity of its end extending outwardly beyond the outer plates 14 and 15. Each transverse recess 37 extends perpendicularly to the axis 36 of a respective clamping pin 24, to a depth approximately of the axis 36, and is formed as a substantially U-shaped cut-out, which is open at one side. The cone 42 extends over the entire length of the pin portion which in a mounted condition laterally projects beyond the plates 14 and 15, which plates limit the respective tool halves 12 and 13 laterally. The clamping pin portion between the cone 42 and the pin head 34 which in the mounted position is received in the plates 14 and 15 is, however, implemented as a cylindrical portion. The cone 42 has, as can be seen from FIG. 6, only a small angle of convergence, and the transverse recesses 37 are arranged in the region of the conical portion.

A receiving hole 25 which intersects a bearing opening 27 for a locking rod 26 at a location distant from the center of a respective fast clamping plate 16, 17 or 16', 17' is formed as a conical opening, so as to match the shape of the cone 42 of the clamping pin 24.

The receiving openings 25 for the clamping pins 24, and the bearing openings 27 for receiving the locking rods 26 extend perpendicularly relative to one another in the fast clamping plates 16, 17 or 16', 17', and intersect one another. As can be seen from FIG. 8, they are offset relative to one another by a distance 38, so that when the clamping pins 24 are in the clamping position and the locking rods 26 are in the locking position, the locking pins 26 engage with their eccentric clamping cams 31 the transverse recesses in the clamping pins 24, as shown in FIG. 8. In this position the bearing pins 32 are received at the side which is distal from the bearing portion 28 of the locking rods 26 in the correspondingly shaped bearing openings 39 in the fast clamping plates 16, 17 and 16', 17', and the locking rods 26 are supported on each side of the eccentric clamping cam 31. In this mounted position, a rotation of each locking rod 26 about its longitudinal axis 40 causes the eccentric clamping cams 31 to cooperate with the clamping surfaces 41 of the transverse recesses 37 in the clamping pins 24, and therefore results in a precise securement of the associated tool halves 12, 13 to the fast clamping plates 16, 17 or 16', 17'; each such fast clamping plate 16, 17 or 16', 17', in turn, is mounted on the respective receiving plate 20, 21 of the machine in a rigid and yet releasable manner.

During operative use of the inventive tool, the fast clamping plates 16 and 17 or 16' and 17' are mounted on the receiving plates 20 and 21 in the manner shown in FIG. 1, and the position of the fast clamping plates 16, 17 or 16', 17' is ensured by the centering projection 19, or by the centering sleeve 19'. Mounting of the fast clamping plates 16, 17 or 16', 17' on the above mentioned receiving plates 20 and 21 is performed in a known manner by means of mounting screws which are not shown. After the mounting of the fast clamping plates 16, 17 or 16', 17' on the receiving plates 20 and 21 of the machine, the locking rods 26 are withdrawn from their bearing openings 27 and 39 by such a measure for the purpose of mounting the tool, that the eccentric clamping cam 31 and the bearing pin 32 no longer extend into the receiving openings 25 of the clamping pins 24.

After these mounting preparations, the tool 10 which is provided with the clamping pins 24 can be mounted in such a manner that the tool 10 is inserted in a correct position between the receiving plates 20 and 21 provided with the fast clamping plates 16, 17 or 16', 17'. Then first the clamping pins 24 of the tool half 13 which is close to the stationary receiving plate 21 of the machine are inserted into the receiving openings 25 in the fast clamping plate 17 or 17', which is mounted on the above-mentioned receiving plate 21. Subsequently the locking rods 26 are axially displaced in their bearing openings 27 and 39 so that the eccentric clamping cams 31 engage the transverse recesses 37 at the ends of the clamping pins 24, and the bearing pins 32, which adjoin these eccentric clamping cams 31, are received in the appropriately dimensioned bearing openings 39. Following this preliminary mounting, the locking rods 26 need only to be rotated about their longitudinal axes 40 into an engaging position with the recesses 37 of the clamping pins 24, so as to attain, due to cooperation of the eccentric clamping cams 31 with the clamping surfaces 41 of the transverse recesses 37, a form-locking rigid connection of the tool half 13 with the associated fast clamping plate 17 or 17'.

Clamping of the other tool half 12 is then performed in such a manner that the movable receiving plate 20, which is also provided with a fast clamping plate 16 or 16', and is received in transverse guidances 43 and 44, not further described in detail, is moved onto the tool 10 in the direction of the double arrow 45 shown in FIG. 1, relative to the stationary receiving plate 21. The receiving plate 20, in turn is held, for example, by means of a crane, or is otherwise supported in an appropriate position. This movement is performed until the clamping pins 24 of this tool half 12 completely engage the receiving openings 25 of the fast clamping plate 16 or 16' arranged on the movable receiving plate 20. Insertion of the associated locking rods 26 into their bearing openings 27 and 39, and rotation of the locking rods 26 into their clamping positions then results in clamping of this tool half 12 to the above-mentioned fast clamping plate 16 or 16'.

It can be seen that when the tool 10 formed as an injection mold is designed in accordance with the present invention, an extremely simple and fast tool exchange or replacement is attained, in which the tool 10 is suspended on a crane or supported in any other manner prior to dismounting, whereupon the locking rods 26 are disengaged from the transverse recesses 37 of the clamping pins 24 by rotation about their longitudinal axes 40 and axial withdrawal from their locking openings 27 and 39. Then the movable receiving plate 20 of the machine can be laterally displaced in accordance with the double arrow 45 in FIG. 1, whereby the clamping pins 24 are disengaged from the receiving openings 25 of the clamping plate 16 or 16' connected with the above-mentioned receiving plate 20. The displacement of the tool 10 from the stationary receiving plate 21 of the machine is performed until the clamping pins 24 which are associated with the adjacent tool half 13, are disengaged from the receiving openings 25 of the fast clamping plate 17 or 17' associated with the receiving plate 21. The tool is then freed, and can be removed from the machine in a manner not further described, and be replaced by another tool 10, whose mounting is performed in the above-described manner.

In the above-illustrated embodiment, each tool half 12 and 13 has four clamping pins 24, which are received in the receiving openings 25 arranged in the respective fast clamping plate 16, 17 or 16', 17' in the appropriate position, and thereby center and secure the position of the tool half 12 or 13 relative to the respective fast clamping plate 16, 17 or 16', 17'. It is to be understood that depending on the characteristics of the tool 10 and/or the stresses which occur during opening of the tool 10, any other number of clamping pins 24 can also be provided. For appropriate positioning of the respective tool half 12 or 13 relative to the associated fast clamping plate 16, 17 or 16', 17', each tool half 12 or 13 is to be provided with at least two clamping pins 24. In view of the above-mentioned provisions on the clamping pins 24 of the cones 42, which narrow toward the free clamping pin ends, a simple and trouble-free insertion of the clamping pins 24 into the receiving openings 25 of the fast clamping plates 16, 17 or 16', 17' is made possible, and thereby a precise centering of the tool halves 12 and 13 during clamping is ensured.

The present invention is not limited to the details shown since various modifications and structural changes are possible without departing in any way from the spirit of the present invention.

What is desired to be protected by Letters Patent is set forth in particular in the appended claims.

What is claimed is:

1. A tool adapted to be mounted on a machine having two receiving plates, comprising in combination
    two tool halves which are movable relative to one another and each of which is mountable on the respective one of the two receiving plates of the machine,
    fast clamping plates each mountable on the respective one of the two receiving plates of the machine and extending along a plane,
    fast coupling means for rigidly and releasably connecting each of said tool halves with a different one of said fast clamping plates,
    said fast coupling means including a plurality of receiving openings provided in said fast clamping plates and each extending substantially perpendicularly to said plane of the respective fast clamping plate, and a plurality of clamping pins which are secured to and extend beyond said tool halves and are received in said receiving openings, each of said clamping pins having a transverse recess extending substantially perpendicularly threto and at least partially bounded by a clamping face, and
    locking elements which form-lockingly engage in said transverse recesses,
    said fast coupling means further including bearing openings provided in said fast coupling plates and extending substantially perpendicularly to said receiving openings of said clamping pins, so that said locking elements are received in said bearing openings and are disengageable from said transverse recesses of said clamping pins,
    each of said clamping pins having a free end and a portion which in a coupling position engages in a respective one of said receiving openings, and is provided with a cone which narrows toward said free end of a respective one of said clamping pins,
    each of said receiving openings in said fast clamping plates being provided with a conical portion which is formed to match and to be engaged by said cone of the respective one of said clamping pins, and
    each of said locking elements being formed as a rotatably supported locking rod which is received in the respective one of said bearing openings for rotation about an axis and for displacement along an axial direction and is provided with an eccentric clamping cam which in a coupling position engages in said transverse recess of the respective one of said clamping pins and on rotation of the respective locking element clampingly engages said clamping face of the respective one of said transverse recesses.

2. A tool as defined in claim 1, wherein said cone extends over the entire length of said portion of the respective one of said clamping pins.

3. A tool as defined in claim 1, wherein each of said locking rods has two bearing portions each provided at a different axial side of said eccentric clamping cam and being supported in said bearing opening for coaxial rotation.

4. A tool as defined in claim 1, wherein each of said clamping pins has a portion which in a coupling position engages a respective one of said receiving openings of said fast clamping plates, each of said transverse recesses being formed in the region of said portion so as to be open at one side thereof, and extending substantially along a longitudinal axis of said clamping pin, each of said recesses being substantially U-shaped and limited by a clamping face which faces away from said free end of said clamping pin.

* * * * *